Patented Feb. 12, 1935

1,990,844

UNITED STATES PATENT OFFICE 1,990,844

ELECTRICAL INSULATING MATERIALS

Willoughby Statham Smith, Newton Poppleford, Henry Joseph Garnett, Sevenoaks, John Norman Dean, Orpington, Bernard James Habgood, Bournemouth, and Henry Charles Channon, South Kensington, London, England No Drawing. Application February 6, 1930, Serial No. 426,440. In Great Britain February 11, 1929

14 Claims. (Cl. 18—50)

The present invention relates to the manufacture of electrical insulating materials comprising rubber and the treatment thereof to obtain a material possessing the properties of low leakance and low dielectric constant.

It is known that when untreated raw rubber, of ordinary good commercial quality, is treated with a solvent at ordinary temperatures, it is separated into two fractions, one of which known as sol-rubber, forms a highly viscous solution while the other fraction, known as gel-rubber, swells but does not dissolve. It is also known that the fraction of the rubber which goes into solution, after separation from the swollen residue, is practically free from non-rubber substances such as proteins and sugars, these bodies being left in the swollen insoluble network of the gel-rubber. The solution of rubber obtained in this way has a very high viscosity even for low concentrations of rubber, so that it is necessary to use very large volumes of solvent to obtain a solution of sufficient fluidity. For this reason difficulties are met with when an attempt is made to apply the process on a commercial scale, for the preparation of rubber free from non-rubber substances.

It is known that when untreated raw rubber is acted upon by a solvent, a yield of only about 50% of purified rubber, free from nitrogenous constituents can be obtained, the remaining 50% consisting of the insoluble gel fraction and the non-rubber bodies that are insoluble in the solvent.

There are two methods commonly used in practice for disaggregating or depolymerizing raw rubber, one of which consists in subjecting the rubber to some form of mechanical treatment, such as rolling, while the other method consists in subjecting the raw rubber to a heat treatment.

As the result of experiment we have now found the mechanical method of disaggregating the rubber is unsuitable, where it is desired to obtain a purified rubber owing to the fact that such mechanical working also disperses the non-rubber bodies throughout the mass of the rubber, so that it becomes much more difficult to remove them. On the other hand, disaggregation, by heat treating the raw rubber has the effect that the non-rubber bodies are not so dispersed throughout the mass of the rubber.

The main object of this invention is an improved method of treatment for removing the non-rubber bodies from the rubber and whereby an increased yield of purified rubber may be obtained.

A further object of the invention is to provide an electrical insulating material having a low alternating current leakance and also a low dielectric constant and further to provide a material having physical and chemical properties that render it particularly suitable for the insulation of submarine signalling conductors.

According to the present invention a yield of purified rubber considerably above 50% is readily obtained without employing an excessive volume of solvent. The process of the invention consists in firstly disaggregating or depolymerizing the raw rubber by heat treatment and then treating with a solvent. The purified rubber is dissolved in a fluid solution which can readily be separated such as, by filtration from the proteins and non-rubber bodies which remain in a state of coagulation with the gel.

The rubber material may be heated to a temperature of about between 50° and 250° C. for a suitable period but the particular temperature to be used and the duration of the heat treatment will depend upon the extent to which it is desired to disaggregate or depolymerize the rubber, and this in its turn will depend upon the use to which the treated rubber is to be put.

The heat treatment may be carried out either in air or an inert gas, or in a vacuum, or in an inert liquid. By an inert liquid is meant one that does not appreciably dissolve or attack the rubber hydrocarbon. For example alcohol is to be considered an inert liquid, since in spite of the fact that it removes certain resins and waxes, it does not attack the rubber hydrocarbon itself. Similarly water is also an inert liquid although it removes the water-soluble bodies, e. g. sugars, and may also react with the proteins, present in the rubber.

The heat treated rubber is dried, if necessary, and then treated with benzene, petroleum spirit or other suitable low boiling point solvent. The solvent may be heated to assist solution. The rubber in solution is then separated from the insoluble residue, in which there is a high concentration of non-rubber bodies, by any suitable known means, such as by filtration or by decantation, and the solvent is removed by any of the known methods, for example by blowing with steam.

Example 1

One part of rubber was heated in water at 140° C. in an autoclave for two-and-a-half hours.

The treated rubber was dried and then allowed to swell in a hundred parts of benzene for seventy hours at 25° C. The solution was separated, filtered and finally steam blown to remove the solvent, after which the rubber thus obtained was worked up in the usual way. A yield of 80% of dry rubber, containing less than 0.1% of protein, was obtained.

When untreated rubber was subjected to a similar process, a yield of only about 50% of sol-rubber of the same purity was obtained.

*Example 2*

One part of white plantation crepe was heated in an atmosphere of nitrogen to a temperature of 240° C. for thirty minutes and was then immersed in one hundred parts of benzene for forty hours at about 25° C. The solution was separated, filtered and finally steam blown to remove the solvent. The rubber thus obtained was worked up in the usual way. A yield of 95% of dry rubber containing less than 0.1% of protein was obtained.

The purified rubber obtained by the processes just described possesses electrical properties much superior to those of the raw rubber, but it is mechanically much weaker.

Owing to its rather weak mechanical properties, the purified rubber obtained as the result of the treatments described above is not suitable when used alone for the insulation of submarine conductors. For the purpose of such an insulation the purified rubber may be hardened by admixture with gutta percha and/or balata which has preferably previously been treated to remove its dirt impurities and/or resin content as described in the specification of Patent No. 1,912,548 to W. S. Smith et al. of June 6, 1934. Mixtures of dirt-free rubber and dirt and resin-free gutta percha possess electrical and other physical and chemical properties that render them very suitable for insulating submarine conductors; in particular their low dielectric constant and low leakance under working conditions of the cable are extremely valuable in loaded sumarine telephone conductors where the frequency of the signalling current is comparatively high.

The purified rubber of this invention will also be found of use in the preparation of the insulating material which is the subject of Patent No. 1,961,306 to W. S. Smith et al. of June 5, 1934.

In place of insulating a conductor with a mixture of purified rubber and hardening material, the conductor may be insulated with an inner layer of the purified rubber and outer layer or layers of some hard material, e. g., deresinified gutta percha.

An alternative method of rendering the purified rubber sufficiently firm for use consists in subjecting it to a process of vulcanization. Suitable fillers and other accessories to vulcanization may be added to the rubber after the non-rubber content has been removed and then the whole vulcanized in the ordinary manner.

Compositions prepared from rubber purified in accordance with the methods described in Examples 1 and 2 above, and a high melting point bitumen as described in the patent to W. S. Smith et al. 1,961,306 referred to above, had excellent properties especially as regards leakance and dielectric constant.

The purified rubber can also be used with advantage as a thickener in the preparation of the pressure-equalizing medium described in United States Patent No. 1,819,720 to W. S. Smith et al. of Aug. 18, 1931, or in the preparation of the impregnated compound described in British Patent 318,439.

Throughout this specification it is understood that the raw rubber will be of the ordinary good commercial quality. Rubbers containing a larger proportion of resin may be employed if this constituent is removed by known methods e. g. extraction with acetone.

In a modification of the method of treating the rubber hereinbefore described the rubber is dissolved in a suitable solvent, e. g. light petroleum or benzene, and the solution heated at a temperature of about 200° C. for about five hours thereby greatly reducing the viscosity of the solution with the result that the solution can be filtered almost as easily as a gutta percha solution of the same concentration, whereby substantially dirt (including proteins, gums, sugars) free rubber can readily be obtained.

A modified method of treatment whereby the separate steps of subjecting the raw rubber to a heat treatment in air or other inert fluid, and then treating it with a solvent may be combined into a single treatment consists in heating the raw material in a solvent under pressure at a temperature of about 200° C. for a period sufficient to reduce the viscosity of the solution whereupon the non-rubber bodies are separated by filtration or other mechanical separation.

A suitable quantity of an antioxidant, for example, tannin or p-aminophenol is then added to stabilize the rubber.

The resins in the rubber may, if necessary and dependent upon the solvent employed, be removed before or after the heat treatment to remove the non-rubber bodies in order to obtain a dirt and resin-free rubber hydrocarbon.

*Example*

A 5% solution of white plantation crepe rubber in benzene was placed in an autoclave and heated at 150° C. for five hours. The pressure rose to 300 lbs. per sq. inch. After cooling, the liquid contents were filtered in a similar way to that used for the preparation of dirt-free gutta percha described in Patent 1,912,548 referred to above. The filtered solution was then steam-blown to remove the solvent and the rubber thus obtained worked up in the usual way.

The pure rubber hydrocarbon and resin obtained by the process described above possesses electrical properties much superior to and more permanent than those of raw rubber or even those of rubber purified by other means, e. g. by hydrolyzing the protein, whereby only a portion of the non-rubber bodies are removed.

The pure rubber hydrocarbon is mechanically less strong than raw rubber and is preferably not used alone for the insulation of submarine conductors but is preferably mixed with gutta percha and/or balata, purified if necessary in the way described in Patent 1,912,548, or is mixed with a high melting point bitumen of low ash and free carbon content as described in Patent 1,961,306 previously referred to or the rubber may be vulcanized in the usual way after adding the necessary accessories.

An insulating composition consisting of 75% of dirt and resin-free gutta percha and 25% of dirt-free rubber obtained by the purifying treatment described above had excellent properties, especially as regards leakance and dielectric constant.

What we claim is:—

1. A method for the preparation of protein free rubber which comprises first subjecting the material to a heat treatment in water sufficient to disaggregate the rubber, then treating the material with a low boiling point solvent to obtain a fluid solution, then separating the proteins and other non-rubber bodies, from the solution, and finally recovering the rubber hydrocarbon from the solution.

2. A method for the preparation of protein free rubber which comprises first subjecting the material to a heat treatment in water at a temperature not exceeding 250° C. sufficient to disaggregate the rubber, then treating the material with a solvent to obtain a fluid solution, then separating the proteins, and other non-rubber bodies, from the solution, and finally recovering the rubber hydrocarbon from the solution.

3. A method for the preparation of protein free rubber which comprises subjecting the material to a heat treatment in a low boiling point solvent under pressure for a period sufficient to reduce the viscosity of the solution, then separating the proteins, and other non-rubber bodies, from the solution, and finally recovering the rubber hydrocarbon from the solution.

4. A method for the preparation of protein free rubber which comprises subjecting the material to a heat treatment in a low boiling point solvent under pressure and at a temperature about 200° C. for a period sufficient to reduce the viscosity of the solution, then separating the proteins, and other non-rubber bodies, from the solution, and finally recovering the rubber hydrocarbon from the solution.

5. A method for the preparation of protein free rubber which comprises first subjecting the material to a heat treatment sufficient to disaggregate the rubber, next treating the material with a low boiling point solvent to obtain a fluid solution, then separating the proteins and other non-rubber bodies from the solution, and finally recovering the rubber hydrocarbon from the solution.

6. A method for the preparation of protein free rubber which comprises first subjecting the material to a heat treatment sufficient to disaggregate the rubber, next treating the material with a low boiling point solvent to obtain a fluid solution, then separating the proteins and other non-rubber bodies, from the solution by passing the solution through a filter, and finally recovering the rubber hydrocarbon from the solution 7. A method for the preparation of protein free rubber which comprises first subjecting the material to a heat treatment in water and lowering the natural state of polymerization of the rubber, then treating the material in a low boiling point solvent to obtain a fluid solution, then separating the gel fraction which contains the non-rubber bodies from the sol rubber, and finally recovering the rubber hydrocarbon from the rubber solution.

8. A method for the preparation of protein free rubber which comprises subjecting the material to a heat treatment in a solvent having a low boiling point below about 120° C., which treatment is carried out under pressure and at a temperature not substantially in excess of 200° C. and for a period sufficient to reduce the viscosity of the solution to enable the non-rubber bodies to be removed, and then removing the non-rubber bodies from the solution, and finally recovering the rubber hydrocarbon from the solution.

9. A method for the preparation of protein free rubber which comprises subjecting the material to a heat treatment in a solvent having a low boiling point below about 120° C. which treatment is carried out under pressure and at a temperature about 150° C. and for a period sufficient to reduce the viscosity of the solution to enable the non-rubber bodies to be removed, and then removing the non-rubber bodies from the solution, and finally recovering the rubber hydrocarbon from the solution.

10. A method for the preparation of protein free rubber as claimed in claim 8, in which the material is subjected to a heat treatment in a light petroleum or benzene.

11. A method for the preparation of protein-free rubber which comprises the separation of a solution of unworked thermally partially disaggregated rubber in a rubber solvent of low boiling-point (below about 120° C.) from the undissolved proteins, followed by the recovery of the rubber hydrocarbon from the solution.

12. A method for the manufacture of protein-free rubber which comprises disaggregating the rubber by means of a heat treatment at a temperature not in excess of 250° C. and extracting the disaggregated rubber from the proteins by means of a low boiling point solvent for the rubber, the heat treatment being applied to the rubber prior to or during extraction with the solvent.

13. A method for the preparation of protein-free rubber which comprises treating rubber material with heat at a temperature sufficient to disaggregate the rubber and with a low boiling point solvent to obtain a fluid solution, then separating the proteins and other non-rubber bodies from the solution, and finally recovering the rubber hydrocarbon from the solution.

14. A method for the preparation of protein-free rubber which comprises subjecting rubber material to a heat treatment sufficient to disaggregate the rubber and extracting the disaggregated rubber from the proteins by means of a low boiling point solvent for the rubber, the heat treatment being applied before completion of the extraction by the solvent, then separating the proteins and other non-rubber bodies from the solution, and then recovering the rubber hydrocarbon from the solution.

WILLOUGHBY STATHAM SMITH.
HENRY JOSEPH GARNETT.
JOHN NORMAN DEAN.
BERNARD JAMES HABGOOD.
HENRY CHARLES CHANNON.